(12) United States Patent
Akutsu et al.

(10) Patent No.: US 9,114,829 B2
(45) Date of Patent: Aug. 25, 2015

(54) IMPACT ABSORBING STEERING APPARATUS

(75) Inventors: Naoto Akutsu, Gunma (JP); Makoto Nagasawa, Gunma (JP)

(73) Assignee: NSK Ltd. (JP)

( * ) Notice: Subject to any disclaimer, the term of this patent is extended or adjusted under 35 U.S.C. 154(b) by 317 days.

(21) Appl. No.: 13/256,706

(22) PCT Filed: Jul. 25, 2011

(86) PCT No.: PCT/JP2011/066880
§ 371 (c)(1),
(2), (4) Date: Feb. 28, 2012

(87) PCT Pub. No.: WO2012/026258
PCT Pub. Date: Mar. 1, 2012

(65) Prior Publication Data
US 2012/0273291 A1 Nov. 1, 2012

(30) Foreign Application Priority Data

Aug. 26, 2010 (JP) ................................. 2010-189083

(51) Int. Cl.
B62D 1/18 (2006.01)
B62D 5/04 (2006.01)
B62D 1/19 (2006.01)

(52) U.S. Cl.
CPC ................ *B62D 1/195* (2013.01); *B62D 1/192* (2013.01); *B62D 5/04* (2013.01)

(58) Field of Classification Search
USPC .......... 180/443, 444, 446; 280/775, 779, 780, 280/777
See application file for complete search history.

(56) References Cited

U.S. PATENT DOCUMENTS

| 5,303,793 | A |   | 4/1994 | Kato et al. |
| 5,511,823 | A |   | 4/1996 | Yamaguchi et al. |
| 5,961,146 | A | * | 10/1999 | Matsumoto et al. .......... 280/777 |
| 6,305,712 | B1 | * | 10/2001 | Hayashi ....................... 280/777 |
| 6,345,842 | B1 | * | 2/2002 | Igarashi et al. ............... 280/775 |
| 6,357,794 | B1 | * | 3/2002 | DuRocher ..................... 280/777 |
| 6,450,532 | B1 | * | 9/2002 | Ryne et al. ................... 280/777 |
| 8,336,669 | B2 | * | 12/2012 | Yamada ....................... 180/443 |
| 8,528,688 | B2 | * | 9/2013 | Mori et al. ................... 180/444 |

(Continued)

FOREIGN PATENT DOCUMENTS

| JP | 08-295245 | 11/1996 |
| JP | 09-024843 | 1/1997 |

(Continued)

*Primary Examiner* — Joseph Rocca
*Assistant Examiner* — Marc A Scharich
(74) *Attorney, Agent, or Firm* — Hartman Global IP Law; Gary M. Hartman; Michael D. Winter

(57) ABSTRACT

Construction is achieved wherein a steering wheel can displace smoothly in the forward direction during a secondary collision, even when an electric motor 13a of an electric power steering apparatus protrudes to the side. The distances from the center axis of the steering column 6c to the connecting sections between the installation plate sections 17e, 17f and a portion 34 fastened to the vehicle body are different from each other on both sides of the steering column 6c, such that the distance Le for the installation plate section 17e located on the side where the electric motor 13a is located is shorter than the distance Lf for the installation plate section 17f that is located on the opposite side from the electric motor 13a. The ratio of a separation load that is applied to the installation plate section 17e on the side where the electric motor 13a is located is made to be large. The tendency for the dropping away toward the front on the side where the electric motor 13, having a large inertial mass, is located, being difficult, is cancelled out by the ease of the dropping away of the installation plate section 17e.

5 Claims, 18 Drawing Sheets

(56) References Cited

U.S. PATENT DOCUMENTS

| | | | |
|---|---|---|---|
| 2009/0183940 A1* | 7/2009 | Sekine et al. | 180/443 |
| 2012/0080873 A1* | 4/2012 | Narita et al. | 280/777 |
| 2012/0080874 A1* | 4/2012 | Narita et al. | 280/777 |

FOREIGN PATENT DOCUMENTS

| | | |
|---|---|---|
| JP | 2009-029223 | 1/1997 |
| JP | 09-272448 | 10/1997 |
| JP | 10-167083 | 6/1998 |
| JP | 2000-108709 | 4/2000 |
| JP | 2003-118602 | 4/2003 |
| JP | 2004-074985 | 3/2004 |
| JP | 2008-056222 | 3/2008 |
| JP | 09-024843 | 2/2009 |
| JP | 2009-029223 | 2/2009 |
| WO | 20090077832 | 6/2009 |
| WO | 20090077838 | 6/2009 |

* cited by examiner

IMPACT ABSORBING STEERING APPARATUS

CROSS REFERENCE TO RELATED APPLICATIONS

This application claims the benefit of International Application No. PCT/JP2011/066880 filed Jul. 25, 2011, having a claim of priority to JP patent application number 2010-189083 filed Aug. 26, 2010.

TECHNICAL FIELD

The present invention relates to an impact absorbing steering apparatus that is capable of absorbing impact energy that is applied to a steering wheel from the body of a driver during a collision accident, while the steering wheel displaces in the forward direction, and particularly to an impact absorbing steering apparatus having construction wherein an electric motor of an electric power steering apparatus is provided in a location protruding toward the side of a portion of the impact absorbing steering apparatus that displaces in the forward direction together with the steering wheel.

BACKGROUND ART

As illustrated in FIG. 7, the steering apparatus of an automobile is constructed such that it applies a steering angle to the front wheels by transmitting the rotation of a steering wheel 1 to an input shaft 3 of a steering gear unit 2, and pushing or pulling a pair of left and right tie rods 4 as the input shaft 3 rotates. The steering wheel 1 is supported by and fastened to the rear end section of a steering shaft 5, and with the steering shaft 5 passed in the axial direction through a cylindrical shaped steering column 6, the steering shaft 5 is supported by this steering column 6 such that it can rotate freely. The front end section of the steering shaft 5 is connected to the rear end section of an intermediate shaft 8 via a universal joint 7, and the front end section of the intermediate shaft 8 is connected to the input shaft 3 via a separate universal joint 9. The intermediate shaft 8 is constructed such that it is capable of transmitting torque, and such that its entire length can be contracted by an impact load. During a collision accident, regardless of backward displacement of the steering gear unit 2, due to contraction of the intermediate shaft 8, the steering wheel 1 is prevented from displacing toward the rear with the steering shaft 5 and thus from being pressed up against the body of the driver.

During a collision accident, it is required for this kind of steering wheel apparatus for an automobile to have construction that causes the steering wheel 1 to displace in the forward direction as it absorbs impact energy so as to protect the driver. In other words, during a collision accident, after a primary collision of an automobile with another automobile, a secondary collision occurs in which the body of the driver hits the steering wheel 1. Technology has been conventionally employed in which the impact applied to the body of the driver during this secondary collision is lessened by supporting the steering column 6 that supports the steering wheel 1 with respect to the vehicle body so that the steering column 6 drops away toward the front due to the impact load of this secondary collision, and by providing an energy absorbing member, which absorbs an impact load by deforming plastically, between a portion that displaces in the forward direction together with the steering column 6 and the vehicle body.

FIGS. 8 to 11 illustrate an example of an automobile steering apparatus that comprises this kind of impact absorbing function. This steering apparatus comprises a steering column 6a, a bracket 10 on the column side, a pair of left and right held wall sections 11 that are provided on the steering column 6a side, and a bracket 12 on the vehicle body side. A steering shaft 5a is supported on the inner-diameter side of the steering column 6a by way of a rolling bearing that is capable of supporting a radial load and a thrust load such that the steering shaft 5a can only rotate freely. A housing 14 for installing the component members of an electric power steering apparatus such as an electric motor 13 (see FIG. 7) and reduction gear, is connected and fastened to the front end section of the steering column 6a.

Moreover, the bracket 10 on the column side is connected to and supported by the bracket 12 on the vehicle body side such that the bracket 10 can displace in the forward direction and detach due to an impact load that is applied during a secondary collision. The bracket 10 on the column side is formed by connecting and fastening together a top plate 15 and a pair of left and right side plates 16a, 16b, which are metal plates having sufficient strength and rigidity such as steel plate, by a method such as welding. Both end sections in the width direction of the top plate 15 function as installation plate sections 17 for connecting the bracket 10 on the column side to and supporting it by the bracket 12 on the vehicle body side. Cut out sections 18 as illustrated in FIG. 11 are opened at the rear end edge of these installation plate sections 17 in the center section in the width direction of these installation plate sections 17, and capsules 19 are respectively mounted in these cut out sections 18.

These capsules 19 are made of a material that slides easily over the metal plate of the top plate 15 such as a synthetic resin or a soft metal including an aluminum alloy. The capsules 19, in the normal state do not come out from the cut out sections 18, however when a large impact load is applied to the bracket 10 on the column side in the forward direction, members for locking the capsules 19 inside the cut out sections 18 shear, and the capsules 19 come out from the cut out sections 18. More specifically, shear pins span between the concave sections 20 and small through holes 21 that are formed in the inner circumferential edge or surrounding portion around the cut out sections 18 in the installation plate sections 17, and other small through holes 22 that are formed in the capsules 19. These shear pins are formed using a material that can shear under an impact load such as a synthetic resin or a soft metal, and with at least part of each of the pins being tightly pressure fitted inside the small through 21, 22, the pins span between the installation plate sections 17 and the capsules 19, and these installation plate sections 17 support these capsules 19.

Through holes 23 are formed in the center section of the capsules 19 for inserting bolts or studs for connecting the bracket 10 on the column side to and supporting the bracket 10 by the bracket 12 on the vehicle side. In order to connect the bracket 10 on the column side to and supporting the bracket 10 by the bracket 12 on the vehicle side, the bolts are inserted from bottom to top through the through holes 23 in the capsules 19, and screwed into nuts 24 that are supported by and fastened to the bracket 12 on the vehicle side by welding or the like, and tightened. This bracket 12 on the vehicle side is fastened to the vehicle body beforehand, so by tightening the bolts, the bracket 10 on the column side is connected to and supported by the vehicle body so that it can only drop toward the front when a large impact load is applied in the forward direction.

The steering column 6a is supported between the side plates 16a, 16b of the bracket 10 on the column side. The steering column 6a is supported to the bracket 10 on the column side such that the steering column 6a is displaced in the forward direction together with the bracket 10 on the column side, and the steering shaft 5a is supported by the steering column 6a such that the steering shaft 5a can only rotate freely. Therefore, in a secondary collision, when an impact load is applied in the forward direction to the steering wheel 1 that is fastened to the steering shaft 5a, the steering column 6a disengages from the bracket 12 on the column side, and displaces in the forward direction together with the steering wheel 1.

When a large impact load in the forward direction is applied from the steering wheel 1 to the bracket 10 on the column side during a secondary collision, the shear pins that span between the capsules 19 and the installation plate sections 17 shear off, and the capsules 19 come out from the cut out sections 18, and the bracket 10 on the column side displaces in the forward direction. As a result, the steering wheel 1 also displaces in the forward direction, which lessens the impact applied to the body of the driver that hits against the steering wheel 1.

From the aspect of protecting the driver, when the steering wheel 1 is caused to displace in the forward direction during a secondary collision, it is further desired that a mechanism be provided that absorbs the impact energy that is applied to the steering wheel 1 from the body of the driver. For example, even in the construction illustrated in FIG. 7 to FIG. 11, a friction force acts on the areas of contact between the outside surfaces of the held wall sections 11 and the inside surfaces of the side plates 16a, 16b, and a friction force acts on the area of contact between the inner circumferential surface on the front section of the outer column and the outer circumferential surface on the rear end of the inner column, and this becomes resistance to the displacement of the steering wheel 1 in the forward direction, and contributes to absorbing impact energy.

Furthermore, construction is disclosed in Patent Literatures 1 to 3, wherein an energy absorbing member, which allows the steering column to displace in the forward direction while plastically deforming, is supported by the vehicle body and is located between a portion that displaces in the forward direction during a secondary collision and a portion that does not displace in the forward direction during a secondary collision. FIGS. 12 to 14 illustrate a first example of conventional construction as disclosed in Patent Literature 1 in which an energy absorbing member is installed. In the case of this first example of conventional construction, a metal plate that is capable of plastic deformation, such as mild steel plate, and that is bent into the shape illustrated in FIG. 13 is used as the energy absorbing member 25. The rear section of the energy absorbing member 25 is connected to the bracket 12a on the vehicle side together with the pair of left and right installation plate sections 17a that are provided on the bracket 10 on the column side by a bolt 26. U-shaped cut out sections, for example, are formed on the installation plate sections 17a with opened at the rear end edge thereof, and the bolt 26 is inserted though the cut out sections. The front section of the energy absorbing member 25 is bent back in a U shape, and as illustrated in FIG. 12, the edge of the tip end is fitted with part of the installation plate sections 17a, such that during a secondary collision, this edge on the tip end displaces in the forward direction together with the bracket 10a on the column side.

As illustrated in FIG. 14, when a secondary collision occurs, the bracket 10a on the column side displaces in the forward direction while the bolt 26 comes out from the cut out section toward the rear. However, the rear section of the energy absorbing member 25 is supported by the bolt 26, and remains on the portion of the bracket 12a in the vehicle body side. Therefore, the energy absorbing member 25 elongates due to plastic deformation from the state illustrated in FIG. 12 to the state illustrated in FIG. 14. Due to this elongation, impact energy that is applied to the steering wheel 1 during a secondary collision is absorbed, which lessens the impact that is applied to the body of the driver that hit against the steering wheel. Patent Literature 3 also discloses construction similar to that disclosed in Patent Literature 1, wherein an energy absorbing member made using a metal plate is installed.

FIGS. 15 to 17 illustrates a second example of conventional construction as disclosed in Patent Literature 2, wherein an energy absorbing member is installed. In the case of this second example of conventional construction, wires made of metal that is capable of plastic deformation such as mild steel and that are bent into the shapes illustrated in FIG. 16 are used as a pair of energy absorbing members 25a. The bent back base section 27 of the energy absorbing member 25a is fastened to the rear side of the capsule 19a which is supported by the bracket on the vehicle side and does not displace in the forward direction even during a secondary collision. On the other hand, the bent back section 28 on the front end side of the energy absorbing member 25a faces the front end edge of the installation plate section 17b of the bracket 10b on the column side. Furthermore, the straight section 29 that is continuous from the bent back section 28 on the front end side toward both end sections of the wire member passes through a through hole 31 that is formed in the flat plate section 30 of the bracket 10b on the column side is caused to protrude to the rear further than the flat plate section 30.

When a secondary collision occurs, as the steering column 6b to which the bracket 10b on the column side is fastened displaces in the forward direction, the front end edge of the installation plate section 17b engages with and moves the bent back section 28 on the front end of the energy absorbing member 25a. The straight section 29 comes out from the through hole 31, and the bent back section 28 on the front end side is caused to move toward both end sections of the wire. The movement of these bent back sections 28 on the front end sides is performed as plastic deformation of these wire members, so this movement absorbs the impact energy that is applied to the steering wheel during a secondary collision, which lessens the impact applied to the body of the driver that hit against the steering wheel.

RELATED LITERATURE

Patent Literature

[Patent Literature 1] Japanese Patent Application Publication No. H09-24843
[Patent Literature 2] Japanese Patent Application Publication No. H09-272448
[Patent Literature 3] Japanese Patent Application Publication No. H10-167083
[Patent Literature 4] Japanese Patent Application Publication No. 2004-74985

SUMMARY OF THE INVENTION

Problem to be Solved by the Invention

In this kind of impact absorbing steering apparatus, in any construction, in order to completely protect the driver, it is necessary that displacement of the steering column in the forward direction be performed smoothly. However, as disclosed in Patent Literature 4, in the case of construction wherein an electric motor is caused to protrude to one side from a housing for an electric power steering apparatus that is fastened to the front end section of the steering column, it was found through investigation by the inventors that displacement in the forward direction of the steering column during a secondary collision is not always performed smoothly due to the existence of the electric motor.

Therefore, the object of the present invention is to provide construction where in the steering wheel can displace smoothly in the forward direction even in the case of construction wherein the electric motor of an electric power steering apparatus protrudes to the side.

Means for Solving the Problems

An impact absorbing steering apparatus of the present invention comprises:
a steering column;
a steering shaft that is supported on the inside of the steering column such that it rotates freely, and is capable of supporting and fastening to a steering wheel on the rear end section that protrudes from the opening on the rear end of the steering column;
a bracket on the column side that comprises a pair of installation plate sections that protrude toward both the left and right sides of the steering column and that are connected to and supported by a portion that is fastened to a vehicle body such that these installation plate sections drop away toward the front due to an impact load in the forward direction, and is supported by the steering column and supported by the vehicle body such that displacement in the axial direction together with the steering column is possible; and
an electric power steering apparatus that comprises a housing that is supported by the front end section of the steering column, and an electric motor that protrudes to one side from this housing, and that, with this electric motor as a power source, applies an auxiliary torque for the rotation of the steering shaft.

Particularly, in the impact absorbing steering apparatus of the present invention, the distances from the center axis of the steering column to the connecting sections between the installation plate sections and the portion fastened to the vehicle body are different from each other on both sides of the steering column, such that the distance for the installation plate section located on the side where the electric motor is located is shorter than the distance for the installation plate section that is located on the opposite side from the electric motor.

The impact absorbing steering apparatus of the present invention may comprise members provided between the installation plate sections and the portion that is fastened to the vehicle body in the connecting sections, and connected and fastened to both of these.

For example, these members could be a pair of energy absorbing members that are provided between the installation plate sections and the portion that is fastened to the vehicle body, and that each formed by bending a plastically deformable metal plate, each having a plastically deforming section that plastically deforms as the installation plate sections drop away toward the front, allowing the installation plate sections to displace in the forward direction.

Alternatively, the installation plate sections comprise cut out sections that open at the rear end edge of the installation plate sections; the portion fastened to the vehicle body comprises capsules that are supported by this portion such that displacement in the forward direction is prevented even when an impact load is applied to this portion, and that are engaged with the installation plate sections with arranged inside the cut out sections such that they can come out from the cut out sections toward the rear when an impact load is applied to these installation plate sections; and there is a pair of energy absorbing members that are provided between the capsules and the installation plate sections, and that are each formed by bending a plastically deformable wire such that the wire elongates when an impact load is applied to the installation plate sections, allowing the installation plate sections to displace in the forward direction.

The impact absorbing steering apparatus of the present invention comprises: a bracket on the housing side provided with a pair of front side installation plate sections that protrude toward both the left and right of the steering column, and that are supported to the portion that is fastened to the vehicle body such that these front side installation plate sections can drop away toward the front due to an impact load that is applied in the forward direction, the bracket on the housing side being supported by the housing, and together with this housing being supported by the vehicle body such that displacement in the axial direction is possible; wherein the distances from the center axis of the steering column to the connecting sections between the front side installation plate sections and the portion fastened to the vehicle body are different from each other on both sides of the steering column, such that the distance for the front side installation plate section located on the side where the electric motor is located is shorter than the distance for the front side installation plate section that is located on the opposite side from the electric motor. In this case, there can be members that are located between the front side installation plates and the portion fastened to the vehicle, and that are connected and fastened to both of these.

Effect of the Invention

With the impact absorbing steering apparatus comprising an electric power steering apparatus of the present invention, the steering wheel can displace smoothly in the forward direction even when the electric motor of the electric power steering apparatus protrudes to the side. To explain in more detail, first, the impact that is applied to the steering column from the body of a driver by way of the steering wheel during a secondary collision, or in other words, a separation load that acts in a direction that causes the steering column to separate from the vehicle body toward the front is applied in the forward direction along the center axis of the steering column. As illustrated in FIG. 18, in the case of construction in which the distances from the center axis of this steering column to the connecting sections between a pair of left and right installation plate sections and a portion that is fastened to the vehicle body, such as a bolt, are the same, a uniform separation load is applied to these connecting sections. Due to the existence of the electric motor having a large inertial mass, the separation of the connecting section on the side where the electric motor is located is slow.

However, in the case of the present invention, due to a difference in the distances from the center axis of the steering column to the connecting sections between the pair of left and right installation sections and a portion fastened to the vehicle body, the ratios of the impact load applied to the connecting sections differ on the left and right. In other words, as is clear from the leverage theory, the ratio of the separation load that is applied to the connecting section that is located on the side where the electric motor 13a is located is larger than the ratio of the separation load that is applied to the connecting section that is located on the opposite side from the electric motor. Therefore, even for the connecting section on the side where the electric motor is located and where there is a tendency for separation to be slow due to the existence of the electric motor, it is possible for separation to start quickly in the same way as the connecting section on the opposite side from the electric motor. Consequently, the steering column where the installation plate sections are located displace smoothly in nearly the axial direction. As a result, sliding at a plurality of areas of friction fit, and plastic deformation of the energy absorbing members provided between the vehicle body and the steering column, which absorb an impact energy that is applied to this steering column due to a secondary collision, are performed effectively from the aspect of impact energy absorption, and thus it become easier to more completely protect the driver.

BRIEF DESCRIPTION OF THE DRAWINGS

FIG. 18A is a top view illustrating the normal state of an impact absorbing steering apparatus comprising an electric power steering apparatus, and FIG. 18B illustrates the state where a secondary collision has proceeded.

DESCRIPTION OF EMBODIMENTS OF THE INVENTION

As described above, in a conventional impact absorbing steering apparatus, in any construction, when an electric motor is caused to protrude to one side from a housing for an electric power steering apparatus that is fastened to the front end section of the steering column, it was found through investigation by the inventors that displacement in the forward direction of the steering column during a secondary collision is not always performed smoothly due to the existence of the electric motor. The reason for this is explained with reference to FIG. 18.

Figure 18:
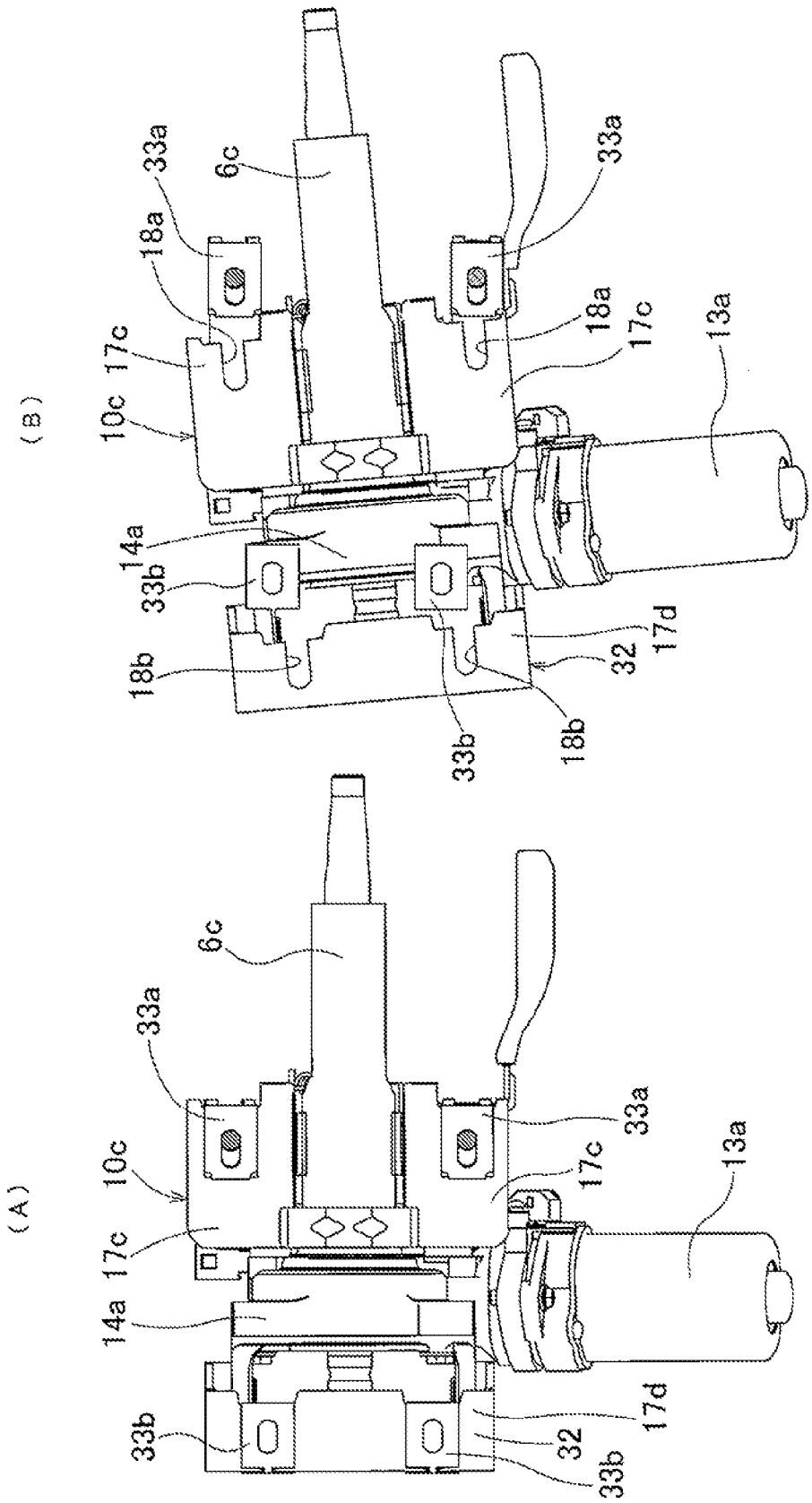
FIGS. 18A and 18B are drawings for explaining the reason that the steering column is inclined during a secondary collision by installed condition of an electric motor, where

FIG. 18 illustrates an impact absorbing steering apparatus comprising an electric power steering apparatus as seen from above. A housing 14a that houses the component parts such as the reduction gear of an electric power steering apparatus is fastened to the front end section of a steering column 6c, and this steering column 6c and housing 14a are supported by the bracket on the vehicle body side such that they are capable of dropping away in the forward direction due an impact load in the forward direction. In order for this, a bracket 10c on the column side that is supported in the middle section of the steering column 6c, and a bracket 32 on the housing side that is supported by the housing 14a are supported by the vehicle body such that they drop away in the forward direction due to an impact load to either in the forward direction. These brackets 10c, 32 both comprise a pair of left and right, or a left and right integrated installation plate sections 17c, 17d, and cut out sections 18a, 18b that are formed in these installation plate sections 17c, 17d with opened at the rear end edge of the installation plate sections 17c, 17d. With these cut out sections 18a, 18b covered, sliding plates 33a, 33b are installed on both the left and right end sections of the brackets 10c, 32. Then left and right end sections of these brackets 10c, 32 are supported by the vehicle body by bolts or studs that are inserted through the through holes that are formed in these brackets 10c, 32.

During a secondary collision, the bolts or studs come out from the cut out sections 18a, 18b together with the sliding plates 33a, 33b, which allows the steering column 6c and housing 14a to displace in the forward direction. In this case, when these members 6a, 14a displace along the axial direction of the steering column 6c, they drop away in the forward direction and displace smoothly, so the impact applied to the body of the driver that hit against the steering wheel is effectively lessened. However, in the case of the construction illustrated in FIG. 18, the electric motor 13a that becomes an auxiliary power source for the electric power steering apparatus has a large weight and large inertial mass, and in the case of construction in which this electric motor 13a protrudes to one side of the housing 14a, there is a tendency during a secondary collision for the housing 14 to which the electric motor 13a is fastened and supported by to become inclined with respect to the axial direction.

In other words, for the electric motor 13a having a large inertial mass, the start of displacement when an impact load is received during a secondary collision has a tendency to be delayed when compared with other parts that have a relative small inertial mass. As a result, during a secondary collision, the steering column 6c and the housing 14a displace in the forward direction with the side of the electric motor 13a inclined as is toward the rear more than the side opposite from the electric motor 13a as illustrated in FIGS. 18A and 18B. This kind of displacement toward the front is performed as the friction fit at a plurality of locations is caused to slide, and the energy absorbing member provided between the vehicle side and the steering column 6c or housing 14a side is caused to plastically deform. Sliding of the areas of friction fit and the plastic deformation of the energy absorbing member are designed to be effectively performed when the steering column 6c and housing 14a displace in the axial direction of the steering column 6c. On the other hand, as illustrated in FIGS. 18A and 18B, displacement of the steering wheel 6c and housing 14a in the forward direction in an inclined state is not advantageous from the aspect of completely protecting the driver.

The present invention was developed based on this kind of knowledge. The embodiments of the present invention, will be explained in detail with reference to the drawings. However, the present invention is not limited to these embodiments.

Embodiment 1

FIG. 1 to FIG. 5 illustrate a first example of a first embodiment of the present invention. Similar to the construction illustrated in FIG. 18, a housing 14a that houses component parts such as the reduction gear of an electric power steering apparatus is fastened to the front end section of a steering column 6c. Moreover, an electric motor 13a that will function as an auxiliary power source for the electric power steering apparatus is supported by and fastened to the surface on one side of the housing 14a. Furthermore, the steering column 6c and housing 14a are supported by a bracket on the vehicle side so that they drop away toward the front due to an impact load in the forward direction.

Therefore, the bracket 10d on the column side that is supported by the middle section of the steering column 6c, and the bracket 32 on the housing side that is supported by the housing 14a are supported by a bracket 12b on the vehicle side (represented in phantom line in FIG. 1) that is fastened to the vehicle body so that both drop way toward the front by a impact load in the forward direction. These brackets 10d, 32 comprise a pair of left and right installation plate sections 17e, 17f, or a left and right integrated installation plate section 17d, and cut out sections 18a, 18b that open to the rear end edges of the installation plates 17e, 17f, 17d are formed in these installation plate sections 17e, 17f, 17d. In a state that covers these cut out sections 18a, 18b covered, sliding plates 33a, 33b are attached to both the left and right end sections of the brackets 10d, 32. These sliding plates 33a, 33b are formed into a long U shape with an opening at the front by injection molding of synthetic resin, for example, or by bending of metal plate on which a synthetic resin has been coated on the surface, and these sliding plates 33a, 33b comprise top and bottom plate sections, a connecting section that connects the rear end edges of these top and bottom plate sections together, and through holes that are formed in these top and bottom plate sections in portions that are aligned with each other. Of these top and bottom plate sections, on the tip end edge (front end edge section) of one or both of the plate sections, restraining pieces may be provided in order to prevent the sliding plates 33a 33b from coming out from the installation plate sections 17e, 17f, 17d by engaging with the front end edges of the installations plate sections 17e, 17f, 17d. Both the left and right end sections of the bracket 10d on the column side and the bracket 32 on the housing side are supported by and connected to the vehicle body by bolts 34 that are inserted through the through holes in the cut out sections 18a, 18b of the brackets 10d, 32 and the sliding plates 33a, 33b. The installation plate sections 17e, 17f do not necessarily need to be separate on the left and right, and construction, as the front side installation plate section 17d, in which both ends of an integrated installation plate section protrude in both the left and right direction of the steering column is also included in this pair of installation plate sections.

Particularly, in the case of the construction of this embodiment, the length dimensions of the pair of left and right installation sections 17e, 17f that are provided on the bracket 10d on the column side, or in other words, the dimensions of these installation plate sections 17e, 17f in the width direction of the steering apparatus differ from each other. More specifically, of these installation plate sections 17e, 17f, the length dimension of the installation plate section 17e on the side where the electric motor 13a is located is shorter than the length dimension of the installation plate section 17f on the opposite side from the electric motor 13a. The cut out sections 18a are formed in the tip end sections of these installation plate sections 17e, 17f. Therefore, the connecting sections where the installation plate sections 17e, 17f are connected to the portion that is fastened to the vehicle body by way of the bolts 34, which are inserted through the through holes in the sliding plates 33a, are located on both the left and right end sections of the bracket 10d on the column side.

In order for this, the distance Le of the installation plate section 17e on the side where the electric motor 13a is located from the center axis of the steering column 6c to the connecting section is shorter than the distance Lf of the installation plate section 17f on the opposite side from the electric motor 13a from the center axis of the steering column 6c to the connecting section (Le<Lf). The ratio of these distances Le, Lf (Le/Lf) are set by design while taking into consideration the ratio of the inertial mass of the electric motor 13a with respect to the inertial mass of the overall portion that displaces in the forward direction together with the steering column 6c, or the eccentricity of the position of the center of gravity of the electric motor 13a with respect to the position of the center of gravity of the overall portion that displaces in the forward direction together with the steering column 6c, and taking into consideration experimental results (including computer simulation). Typically, the object of the present invention can be accomplished by keeping the ratio (Le/Lf) within the range about ½ to ⅔. However, when the eccentricity is small, the ratio (Le/Lf) can be greater than ⅔, or in other words, can be close to 1; and when the eccentricity is large, the ratio (Le/Lf) can be less than ½.

Figure 3:
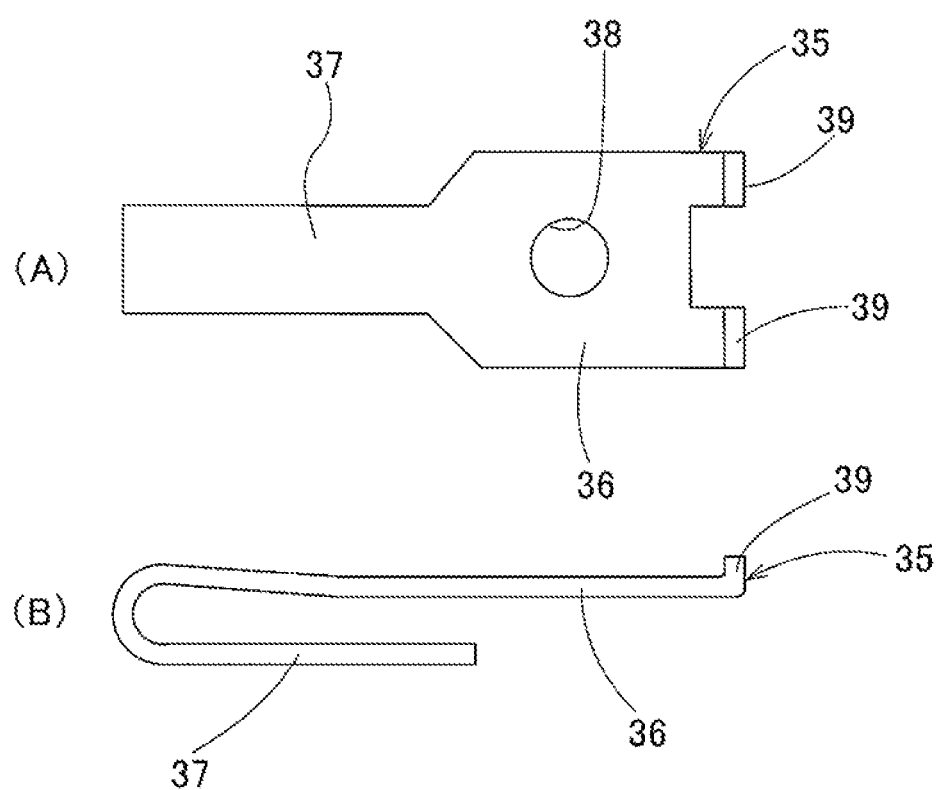
FIG. 3A is a top view and FIG. 3B a side view of the energy absorbing member of the apparatus in FIG. 1.
Figure 4:
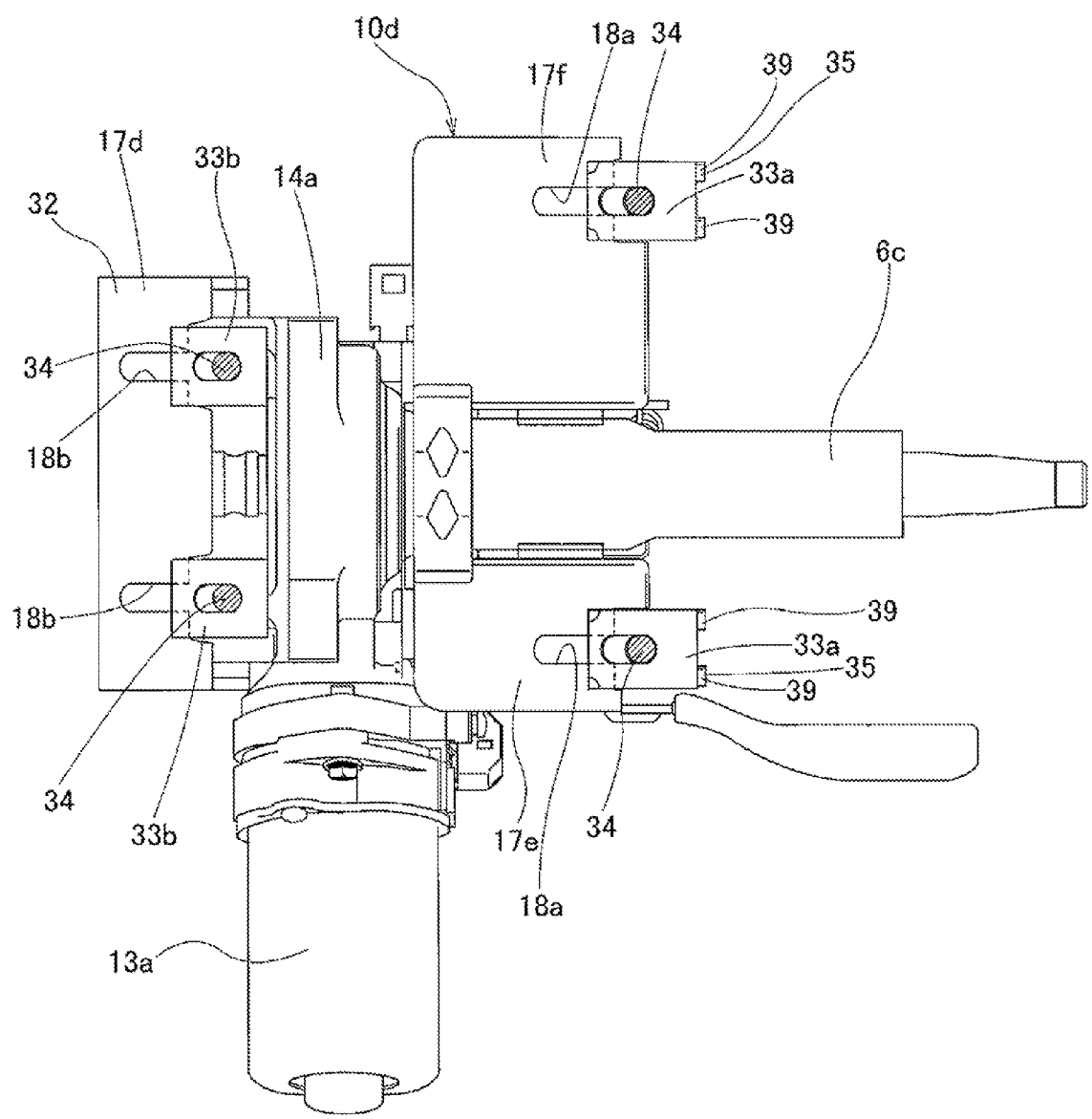
FIG. 4 is a top view illustrating the state where a secondary collision has proceeded of the apparatus in FIG. 1.
Figure 5:
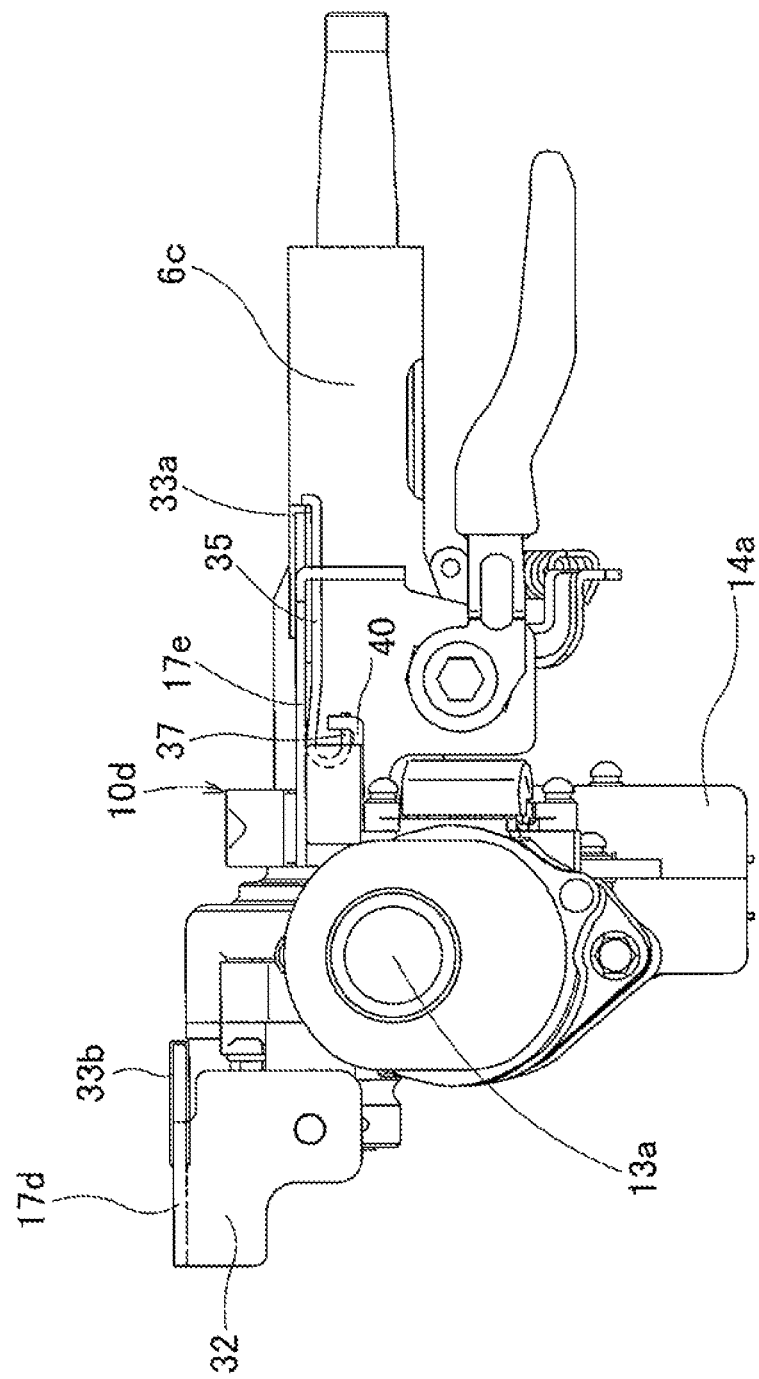
FIG. 5 is a side view of the apparatus in the state illustrated in FIG. 4.
Figure 12:
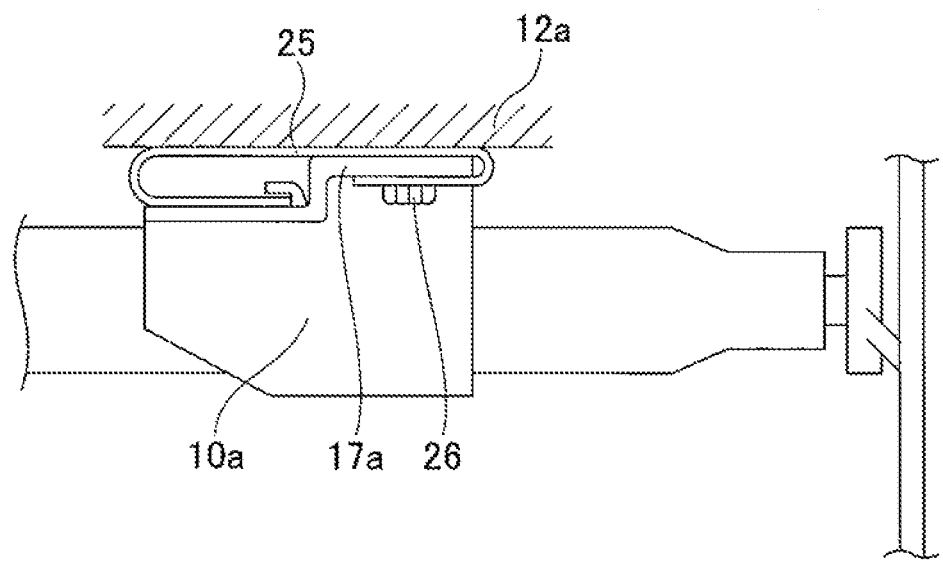
FIG. 12 is a partial side view illustrating a first example of a prior known impact absorbing steering apparatus in which an energy absorbing member is installed.
Figure 13:
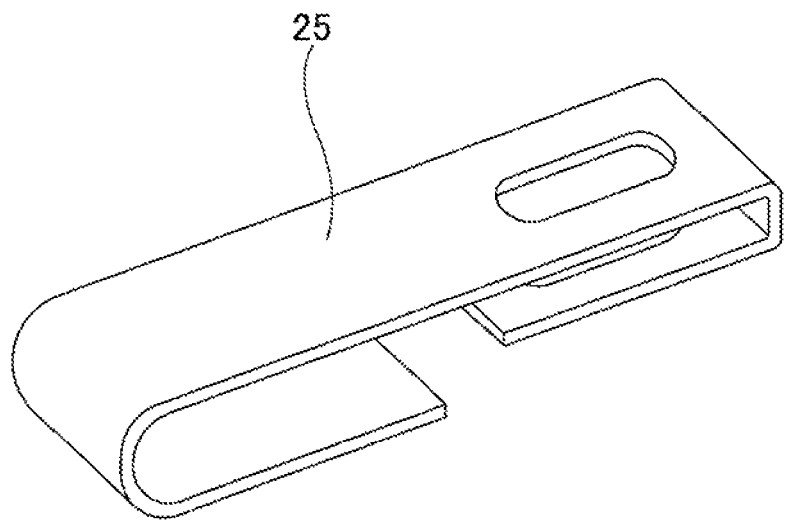
FIG. 13 is a perspective view of the energy absorbing member of the apparatus in FIG. 12 as seen from the upper front.
Figure 14:
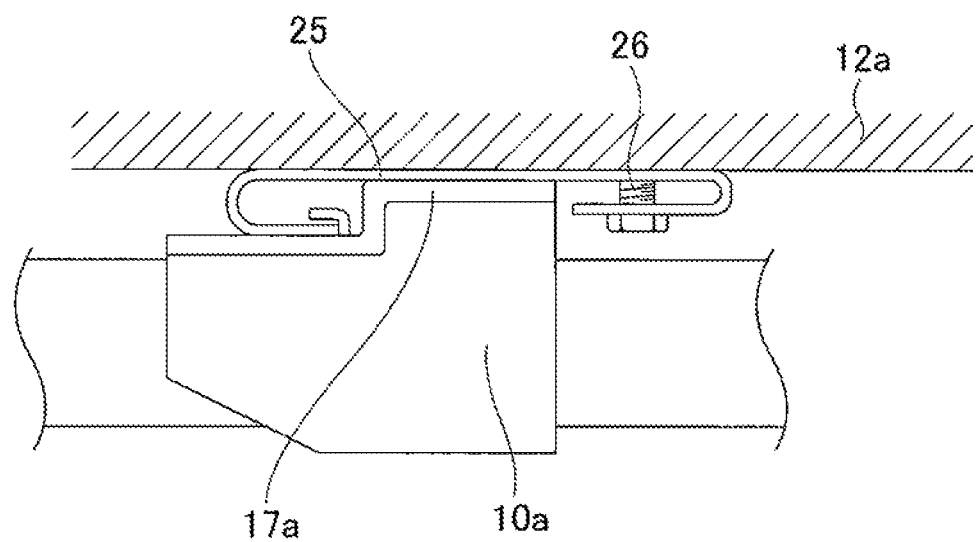
FIG. 14 is a partial side view illustrating the apparatus in FIG. 12 in the state where a secondary collision has proceeded.

Moreover, in this embodiment, a pair of energy absorbing members 35 are provided between the installation plate sections 17e, 17f and the bolts 34, which are the portion fastened to the vehicle body. There energy absorbing members 35 are basically the same as the energy absorbing members 25 disclosed in Patent Literature 1 and explained using FIGS. 12 to 14, and each is formed into a shape as illustrated in FIG. 3 by bending a plastically deformable metal plate such as mild steel plate. In this embodiment, each of these energy absorbing members 35 comprises a base plate section 36 and a plastically deforming section 37. Circular holes 38 for inserting the bolts 34 through the center section of the based plate sections 36 are formed in the base plate sections 36. Moreover, two locations on both end sections in the width direction of the rear end edge of the base plate section 36 are bent upwards to form restraining pieces 39, where the surfaces on the front sides of these restraining pieces 39 engage with the rear end edge of a sliding plate 33a. These restraining pieces 39 are provided for making it possible to position the base plate section 36 with respect to the sliding plate 33a. Furthermore, the plastically deforming section 37 is formed by bending back the middle section of the band shaped plate portion that extends in the forward direction from the center section of the front end edge of the base plate section 36 180° into a U shape.

Figure 1:
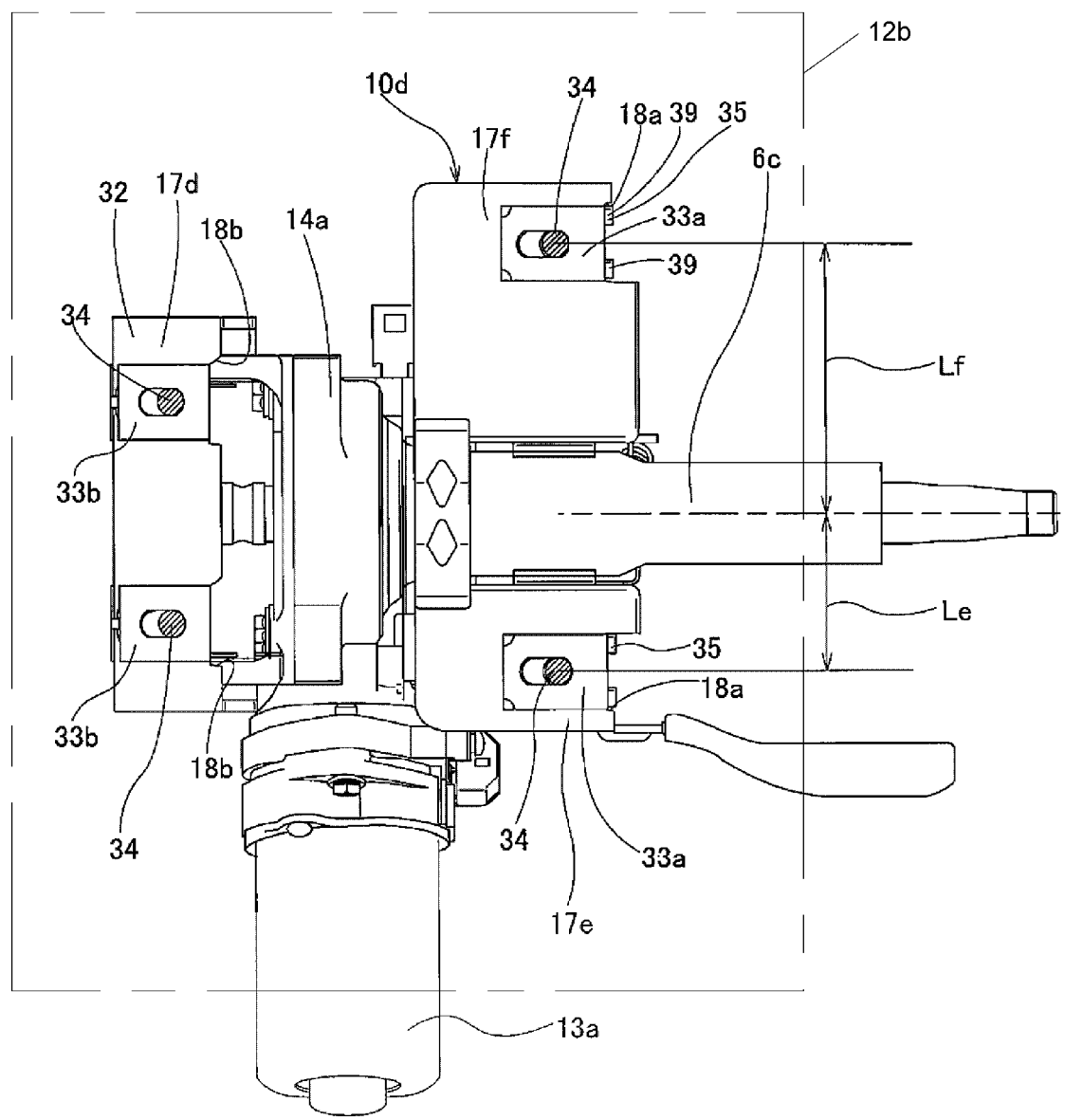
FIG. 1 is a top view illustrating an apparatus of a first embodiment of the present invention.
Figure 2:
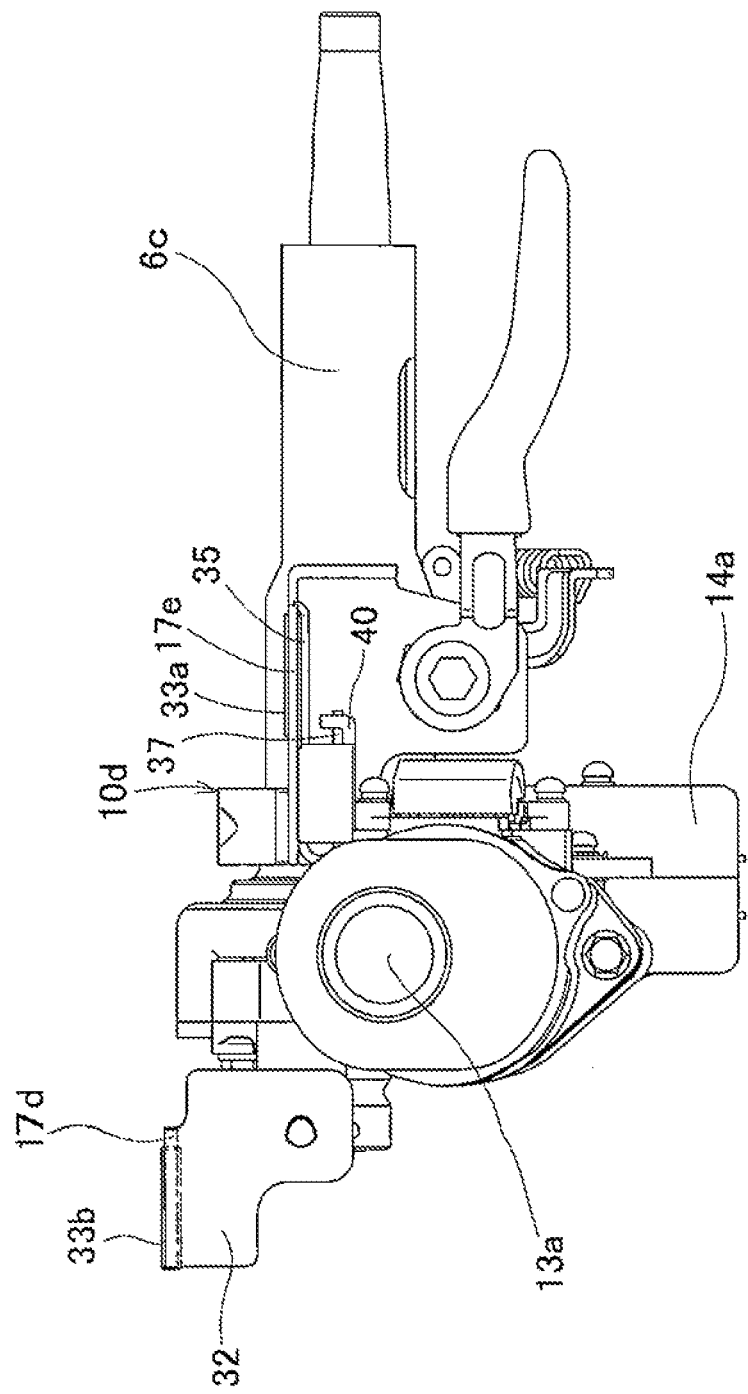
FIG. 2 is a side view of the normal state of the apparatus in FIG. 1.

As illustrated in FIG. 1 and FIG. 2, the base plate section 36 of this kind of energy absorbing member 35 is supported by the bolt 34, and is connected to the bracket 12b on the vehicle side in a state where displacement in the forward direction is prevented. Moreover, the tip end edge of the plastically deforming section 37 engages with the bracket 10d on the column side where the installation plate sections 17e, 17f are located. On both the left and right side of the bracket 10 on the column side, in the portions below the installation plate sections 17e, 17f, an anchor plate section 40 for coming in contact with the tip end edge of the plastically deforming section 37 are formed by bending. This anchor plate section 40 is formed by bending the rear end section of the bottom plate section that is located below the installation plate sections 17e, 17f upward, and the plastically deforming section 37 is located in a space between the bottom surface of these installation plate sections 17e, 17f and the top surface of the bottom plate section.

During a secondary collision, the bolt 34 comes out from the cut out section 18a together with sliding plate 33a and the base plate section 36 of the energy absorbing member 25, which allows the steering column 6c to displace in the forward direction. The bracket 10d on the column side also displaces in the forward direction together with the steering column 6c. When this happens, the bracket 32 on the housing side comes away from the vehicle, and allows the bracket 32 on the housing side to displace in the forward direction. As the bracket 10d on the column side displaces in the forward direction, the plastically deforming section 37 plastically deforms from the state illustrated in FIG. 2 to the state illustrated in FIG. 5 of the energy absorbing member 35 in a direction that causes the bent back section that is formed in the middle section of the band shaped plate portion to move to the tip end side of this band shaped portion. Due to this plastic deformation, the impact energy that is transmitted from the body of the driver to the bracket 10d on the column side by way of the steering shaft 5a and the steering column 6c is absorbed, which lessens the impact applied to the body of the driver.

Particularly, in the case of the construction of this embodiment, due to the difference in the distances Le, Lf from the center axis of the steering column 6c to the bolts 34 that support the installation plate sections 17e, 17f with respect to the bracket on the vehicle side, the impact loads, or in other words, the separation loads that cause the installation plate sections 17e, 17f to separate from the bolts 34 differ from each other. In other words, as is clear from the leverage theory, the ratio of the separation load that is applied to the installation plate section 17e that is located on the side where the distance Le is short and the electric motor 13a is located become large, and conversely, the ratio of the separation load that is applied to the installation plate section 17f that is located on the side where the distance Lf is long an that is opposite from the electric motor 13a becomes small. Due to this kind of difference in separation load, when the existence of the electric motor 13a is ignored, the installation plate section 17e on the side where this electric motor 13a is located drops away more easily than the installation plate section 17f on the opposite side of the electric motor 13a.

However, in actuality, due to the existence of the electric motor 13a having a large inertial mass, it is difficult for the installation plate section 17e on the side where the electric motor 13a is located to displace in the forward direction during a secondary collision. Therefore, the difficulty of displacement in the forward direction of the installation plate section 17e on the side where the electric motor 13a is located, which is due to the existence of this electric motor 13a, and the easy that the installation plate 17e drops away due to the difference in the distances Le, Lf cancel each other out. Consequently, the steering column 6c that supports the bracket 10d on the column side where the installation plate sections 17e, 17f are located, displace smoothly in the axial direction thereof. As a result, sliding between the plurality of locations of friction engagement and plastic deformation of the plastically deforming section 37 of the energy absorbing members 35 that are located between the bolts 34 and the bracket 10d on the column side, which absorb the impact energy that is applied to the steering column 6c during a secondary collision, are performed effectively from the aspect of impact energy absorption, and thus it become easier to more completely protect the driver.

Embodiment 2

Figure 6:
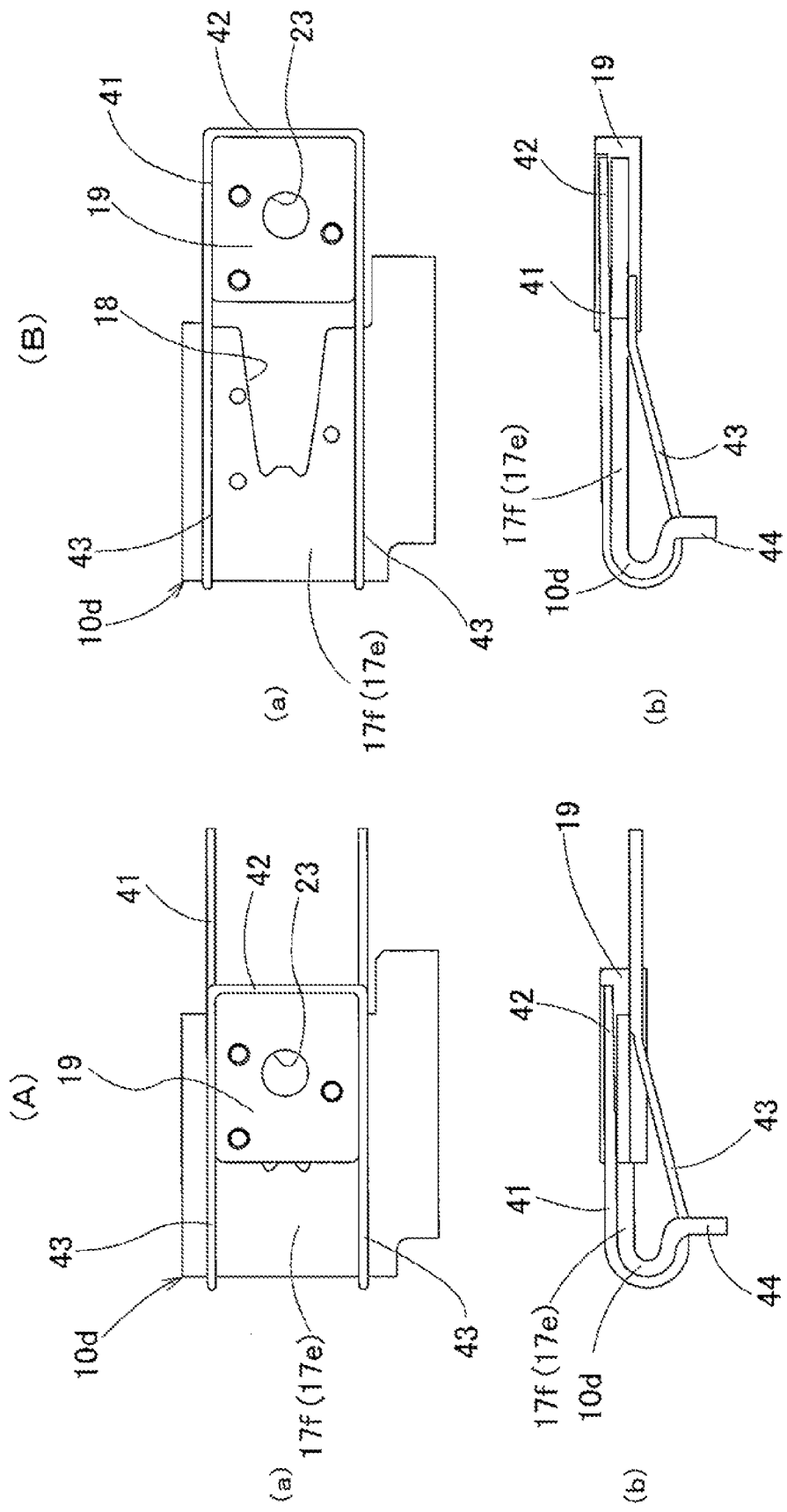
FIG. 6A is a drawing illustrating the normal state of an installation plate section of a support bracket, a capsule installed in the installation plate section, and an energy absorbing member that spans between the installation plate section and the capsule in a second embodiment of the present invention.
FIG. 6B is a drawing illustrating the state where a secondary collision has proceeded, where (a) is a top view and (b) is a side view in each drawing.
Figure 7:
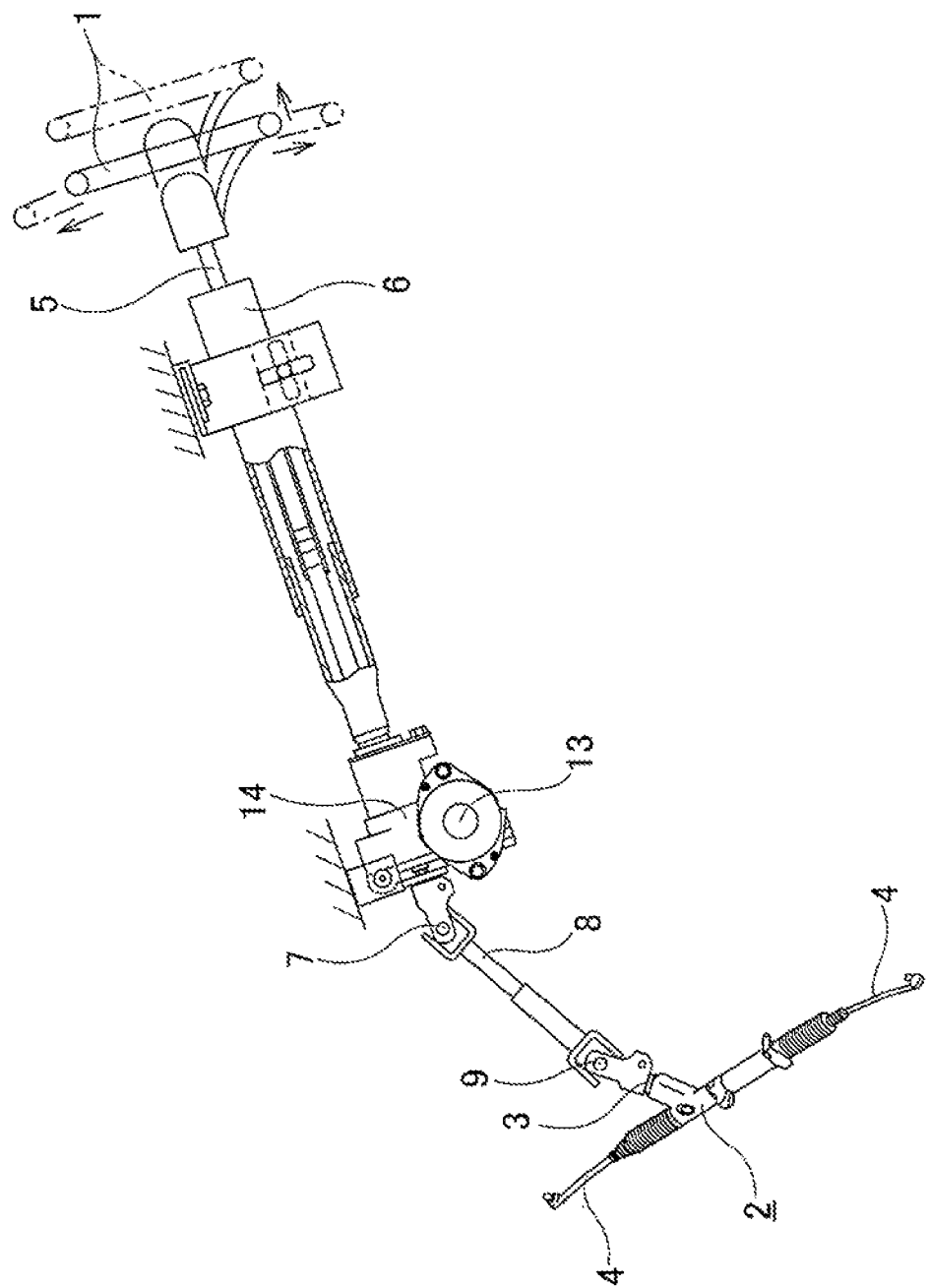
FIG. 7 is a partial cross-sectional view illustrating an example of a conventional steering apparatus.
Figure 8:
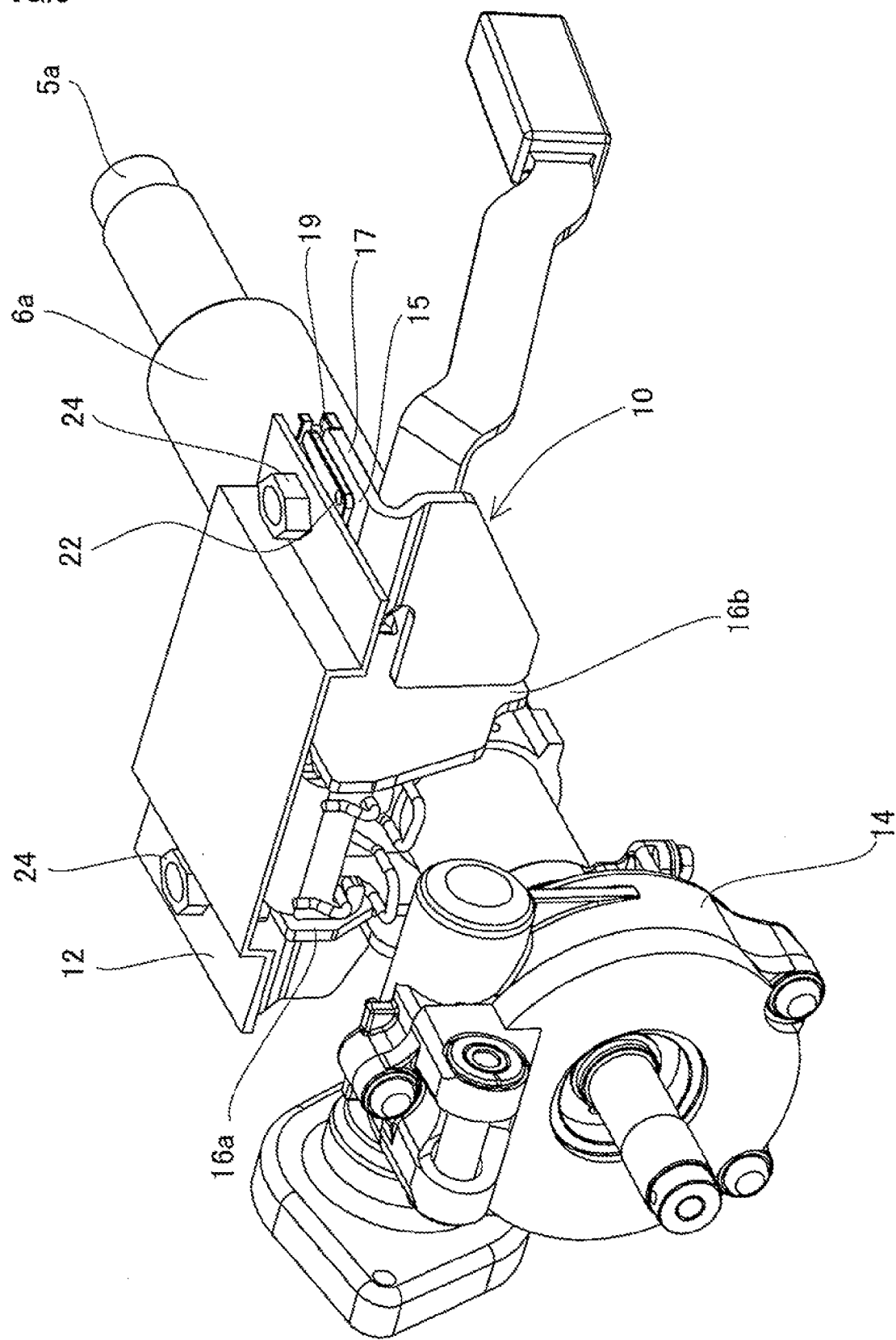
FIG. 8 is a perspective view illustrating an example of a conventional impact absorbing steering apparatus as seen from the upper front.
Figure 15:
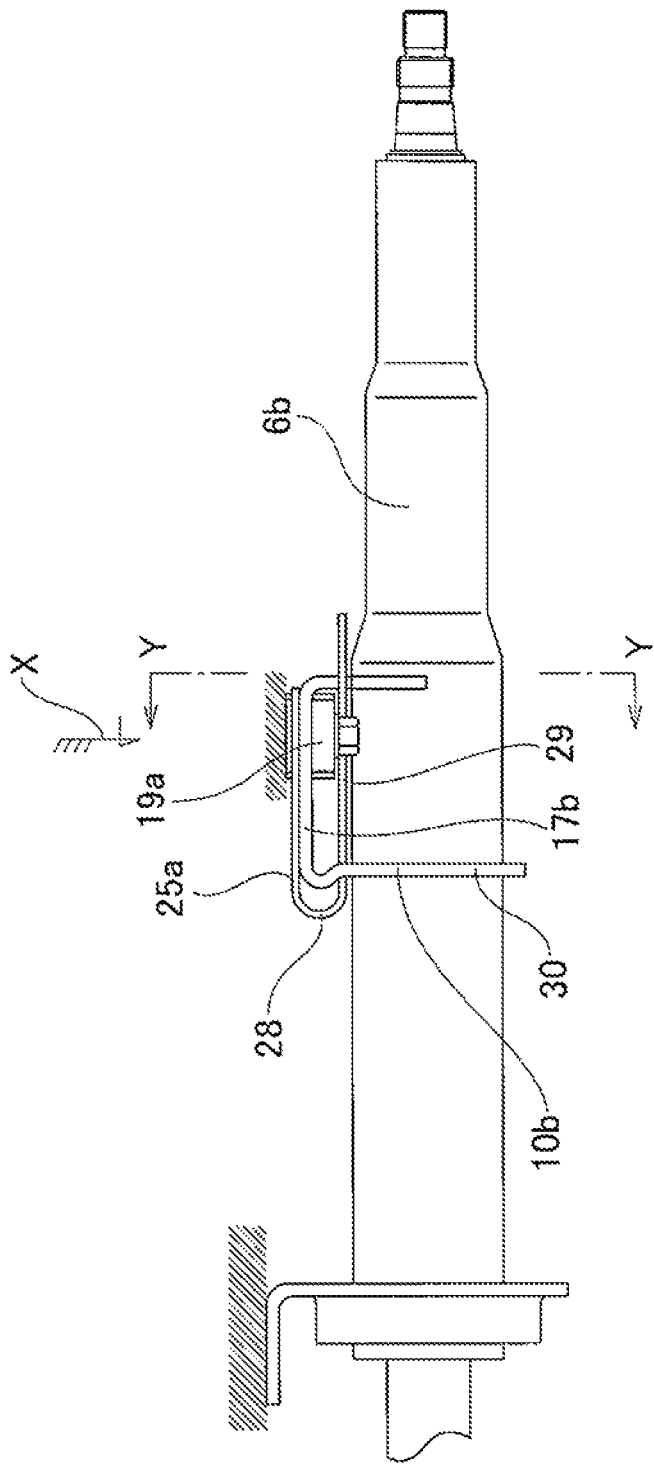
FIG. 15 is a partial side view illustrating a second example of a prior known impact absorbing steering apparatus in which an energy absorbing member is installed.
Figure 16:
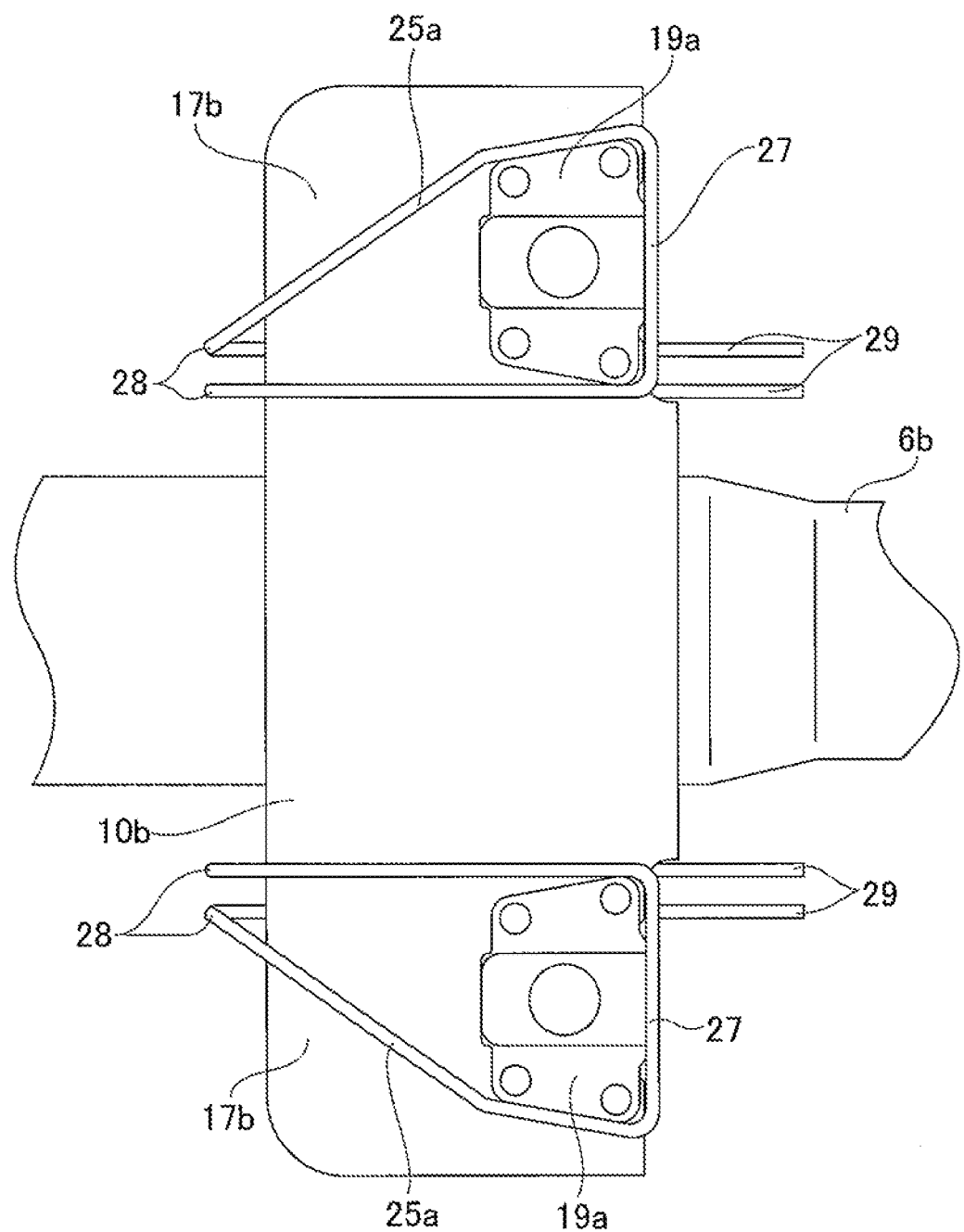
FIG. 16 is a view as seen in the direction X in FIG. 15.

FIG. 6 illustrates a second embodiment of the present invention. In this embodiment, a plastically deformable wire member that is formed by bending such that it is similar to the construction disclosed in Patent Literature 2 illustrated in FIGS. 15 to 17 is used as an energy absorbing member 41 that absorbs impact energy in the forward direction that is transmitted during a secondary collision from the steering to the bracket 10d on the column side that is supported by the steering column 6c (see FIG. 1, FIG. 2, FIG. 4 and FIG. 5), and allows the bracket 10d on the column side to displace in the forward direction.

Figure 9:
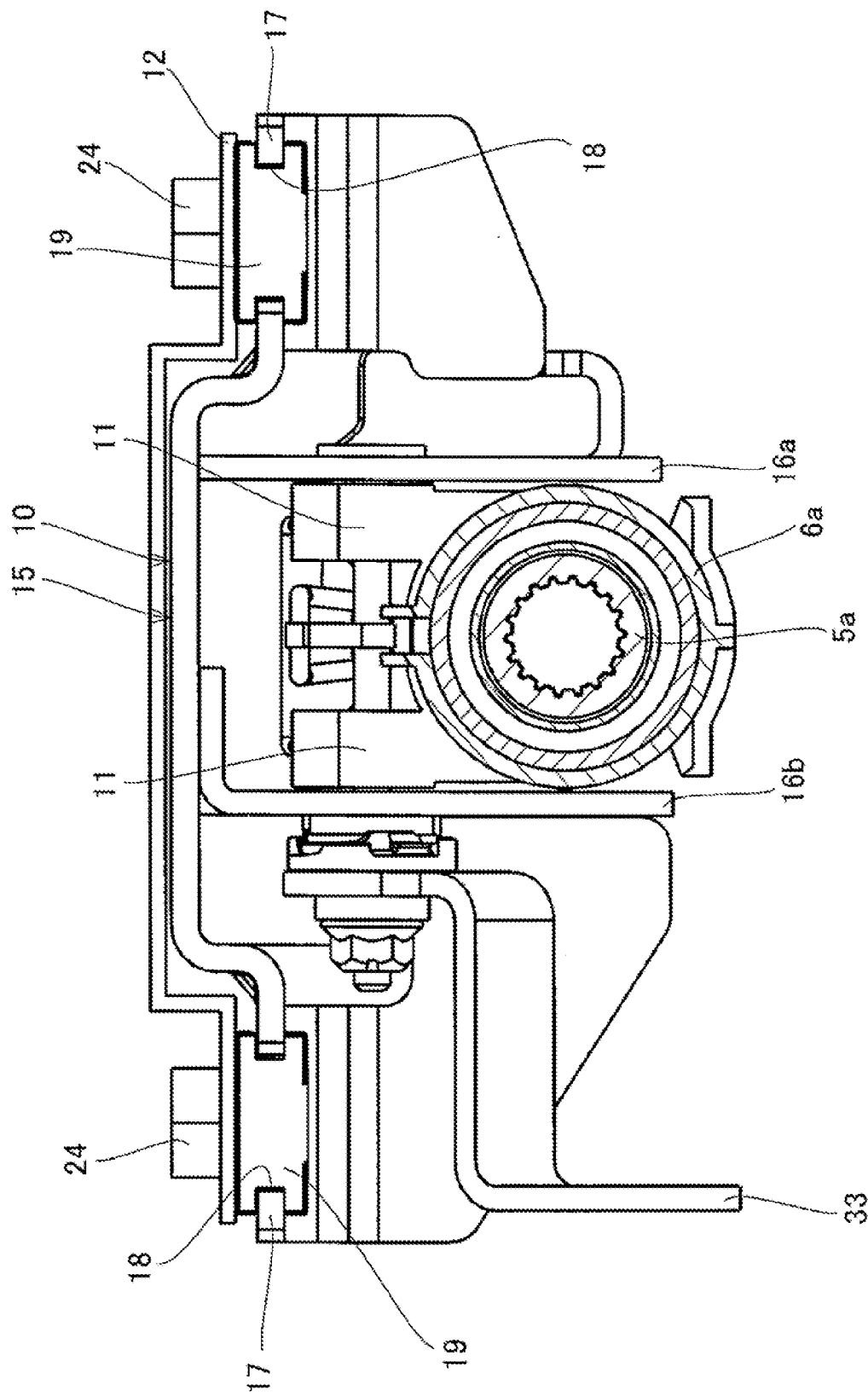
FIG. 9 is a cross-sectional view of the apparatus in FIG. 8.
Figure 10:
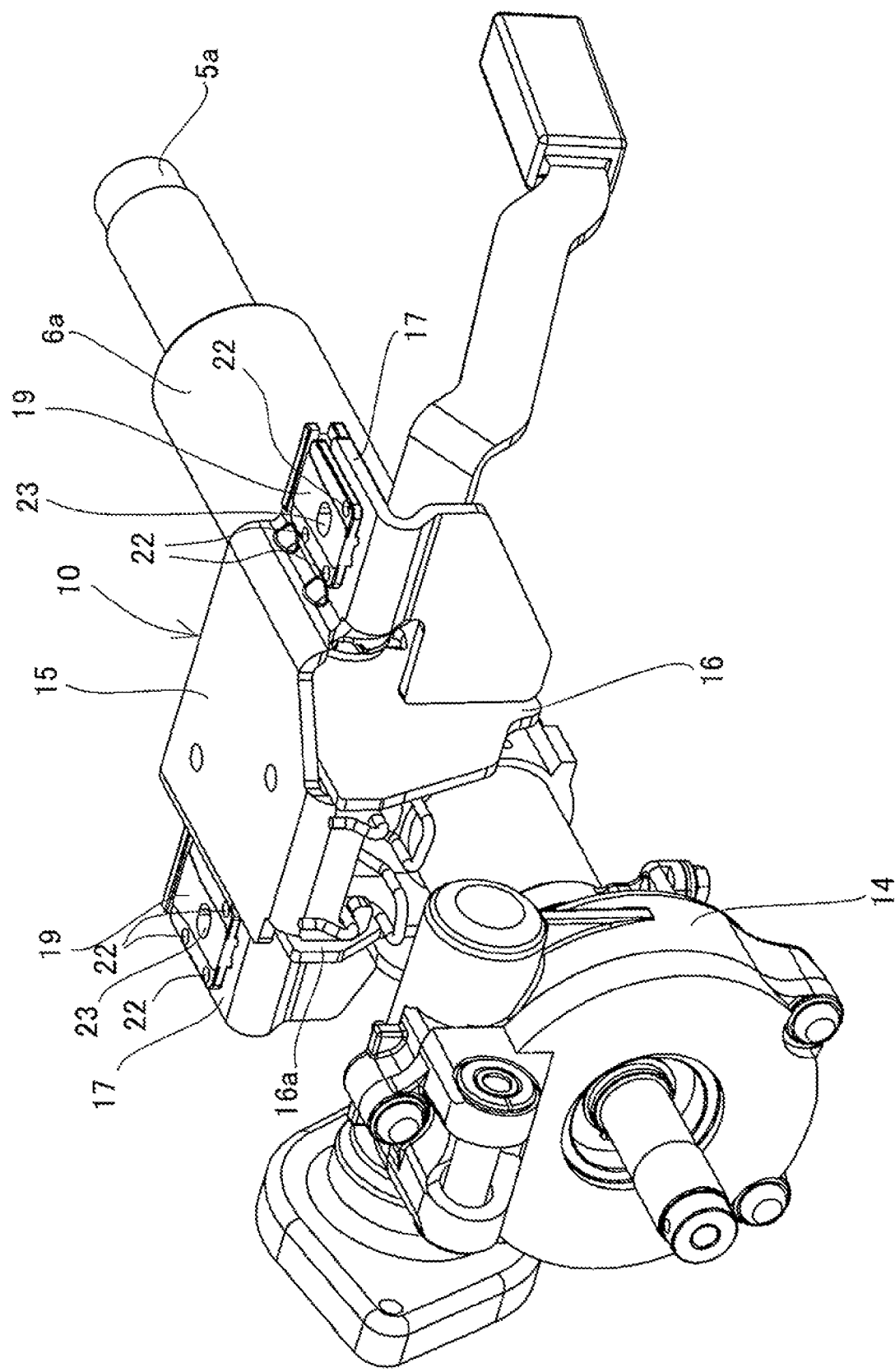
FIG. 10 is a perspective view similar to FIG. 8 and illustrates the apparatus in FIG. 8, with the bracket on the vehicle side omitted.
Figure 11:
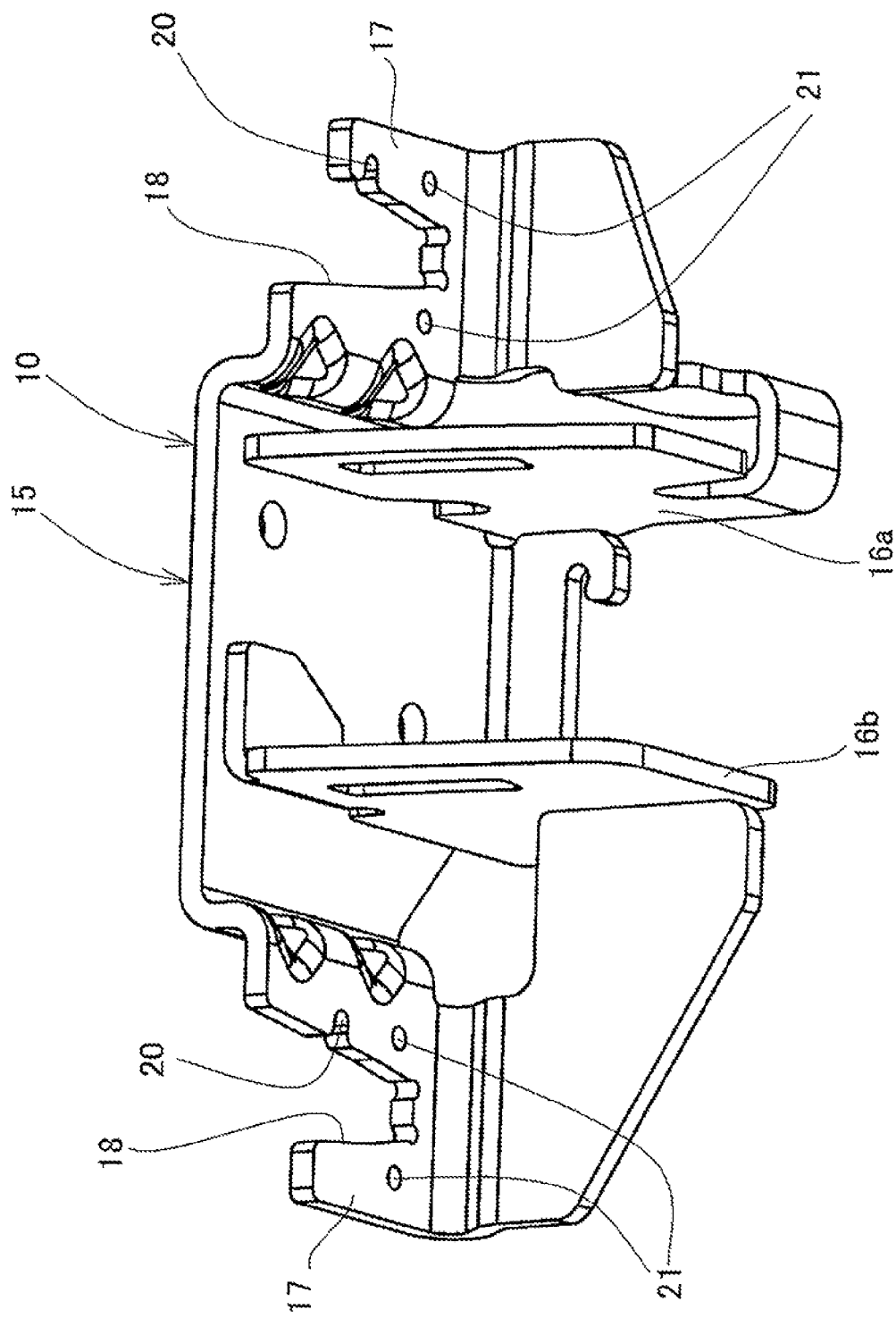
FIG. 11 is a perspective view of the support bracket in the apparatus in FIG. 8 as seen from the lower rear.
Figure 17:
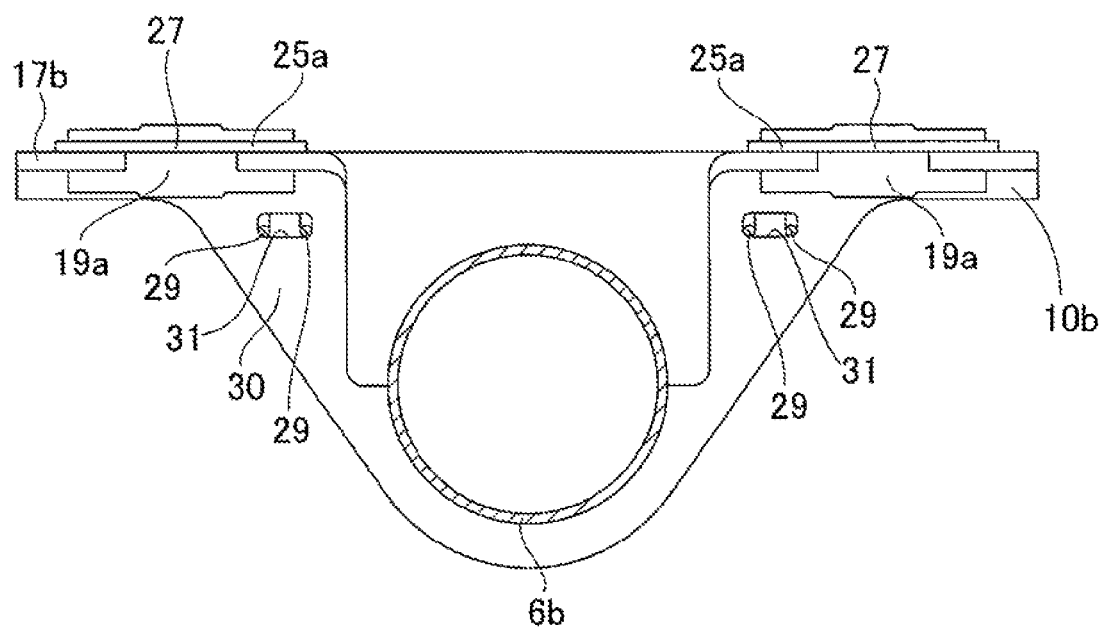
FIG. 17 is a cross-sectional view of section Y-Y in FIG. 15.

In other words, in the case of the construction of this embodiment, similar to the conventional construction illustrated in FIG. 9 and FIG. 11, or similar to the construction disclosed in Patent Literature 2 and illustrated in FIG. 17, cut out sections 18 that open to the rear end edges of the pair of left and right installation plate sections 17f (17e) are formed in this pair of left and right installation plate sections 17f (17e). Capsules 19 are installed inside these cut out sections 18 such that they can come out from the cut out sections 18 when an impact load is applied in the forward direction to the installation plate sections 17f (17e). The construction of this portion employs construction that is conventionally well known such as shear pins that span between the capsules 19 and the installation plate sections 17f (17e). Moreover, by inserting a bolt through a through holes 23 that are formed in the respective capsules 19 and screwing the bolts into nuts that are fastened to the vehicle and tightening, the capsules 19 are supported in a state in which the capsules 19 are prevented from displacing in the forward direction regardless of an impact load in the forward direction.

Furthermore, a pair of energy absorbing members 41 that each have a shape such as illustrated in FIGS. 6A and 6B are provided between the capsules 19 and the installation plate sections 17f (17e). These energy absorbing members 41 are formed by bending a plastically deformable wire, and when a load is applied in the forward direction to the installation plate sections 17f (17e), the wire members elongate, allowing the installation plate sections 17f (17e) to displace in the forward direction. In other words, the energy absorbing members 41 comprise a U-shaped base section 42 that is open in the forward direction, and a pair of left and right plastically deforming sections 43 that extend in the forward direction from both end sections of this base section 42 and are bent back nearly 180° in the middle section. The energy absorbing members 41, each having this kind of construction, are such that the base sections 42 engage with the rear side of the capsules 19, and the bent back sections of the plastically deforming sections 43 face the front end edges of the installation plate sections 17*f* (17*e*), and furthermore, the tip half section of these plastically deforming sections 43 are inserted from the front toward the rear of small through holes that are formed in hanging down plate sections 44 that are formed by bending the front end edges of the installation plate sections 17*f* (17*e*) downward.

During a secondary collision, the front end edges of the installation plate sections 17*f* (17*e*) push against and cause the plastically deforming sections 43 of the energy absorbing members 41 to move toward both end sections of the wire members. This absorbs the impact energy that is applied from the steering wheel to the steering column 6*c*, and allows the steering column 6*c* to displace in the forward direction together with the bracket 10*d* on the column side.

Moreover, in the case of this embodiment, for the installation plate sections 17*e*, 17*f*, the distances Le, Lf from the center axis of the steering column 6*c* to the connecting sections are different from each other (see FIG. 1), so regardless of the existence of the electric motor 13*a*, the steering column 6*c* that supported the bracket 10*d* on the column side displaces smoothly, and thus it is easier to more completely protect the driver.

Except for the difference in the construction of the energy absorbing member 41, this embodiment is the same as the first embodiment described above, so illustrations and explanations of identical parts are omitted.

As illustrated in FIG. 1, FIG. 2, FIG. 4 and FIG. 5, in the case of construction wherein the bracket 10*c* on the column side and the bracket 32 on the housing side are both supported by a portion fastened to the vehicle body so that displacement is possible in the forward direction due to impact energy in a secondary collision, it is sufficient to make the distances Le, Lf between the center axis of the steering column 6*c* and the bolts 34 for the pair of left and right installation plate sections 17*e*, 17*f* different on only the side of the bracket 10*c* on the column side as in the example in the figure. In other words, for the pair of left and right installation plate sections 17*d* located on the bracket 32 on the housing side, it is not absolutely necessary to change the distances from the center of the housing 14*a* to the bolt.

However, in addition to the portion of the bracket 10*c* on the column side, it is also possible to make this distance different between the left and right for the portion of the bracket 32 on the housing side. Even by changing this distance between the left and right in just this portion of the bracket 32 on the housing side, it is possible to obtain construction that is superior to the conventional construction from the aspect of protecting the driver. However, when compared with changing the characteristics between the left and right on the side of the bracket 10*c* on the column side, which is near the input side of the impact energy during a secondary collision, independent employment is disadvantageous from the aspect of tuning becoming difficult, so when applying the present invention to the side of the bracket 32 on the housing side, obtaining a overlapping effect by applying the invention to both the portion of the bracket 10 on the column side and the portion of the bracket 32 on the housing side is preferable.

INDUSTRIAL APPLICABILITY

The present invention can be widely used in a steering apparatus for an automobile, and more specifically in an impact absorbing steering apparatus that, during a collision accident, allows the steering wheel to displace in the forward direction while absorbing impact energy that is applied to the steering wheel from the body of the driver, and more particularly to an impact absorbing steering apparatus having construction wherein the electric motor of an electric power steering apparatus is provided such that it protrudes from one side in a portion that displaces in the forward direction together with the steering wheel.

EXPLANATION OF REFERENCE NUMBERS

1 Steering wheel
2 Steering gear unit
3 Input shaft
4 Tie rod
5, 5*a* Steering shaft
6, 6*a*, 6*b*, 6*c* Steering column
7 Universal joint
8 Intermediate shaft
9 Universal joint
10, 10*a*, 10*b*, 10*c*, 10*d* Bracket on the column side
11 Held wall section
12, 12*a* Bracket on the vehicle side
13, 13*a* Electric motor
14, 14*a* Housing
15 Top plate
16*a*, 16*b* Side plate
17, 17*a*, 17*b*, 17*c*, 17*d*, 17*e*, 17*f* Installation plate section
18, 18*a*, 18*b* Cut out section
19, 19*a* Capsule
20 Concave section
21 Small through hole
22 Small through hole
23 Through hole
24 Nut
25, 25*a* Energy absorbing member
26 Bolt
27 Bent back base section
28 Front end side bent back section
29 Straight section
30 Flat plate section
31 Through hole
32 Bracket on the housing side
33*a*, 33*b* Sliding plate
34 Bolt
35 Energy absorbing member
36 Base plate section
37 Plastically deforming section
38 Circular hole
39 Restraining piece
40 Anchor plate section
41 Energy absorbing member
42 Base section
43 Plastically deforming section
44 Hanging down section

The invention claimed is:
1. An impact absorbing steering apparatus adapted for installation in a vehicle body defining forward and rearward directions, the impact absorbing steering apparatus comprising:
a steering column having first and second sides;
a steering shaft located within and supported by the steering column such that the steering shaft rotates freely, and is adapted for supporting and fastening to a steering wheel on a rearward end section of the steering shaft disposed in the rearward direction of the vehicle body that protrudes from an opening on a rearward end of the steering column disposed in the rearward direction of the vehicle body;

an electric power steering apparatus that comprises a housing supported by a forward end of the steering column disposed in the forward direction of the vehicle body and an electric motor that protrudes from one side of the housing and located at the first side of the steering column, the electric motor being a power source configured to apply an auxiliary torque for rotation of the steering shaft, the impact absorbing steering apparatus further comprising:

a column bracket supported by a middle section of the steering column and configured to secure the steering column to the vehicle body, the column bracket comprising a pair of oppositely-disposed installation plate sections that protrude toward the first and second sides of the steering column and that are connected to and supported by a vehicle bracket that is fastened to the vehicle body, the column bracket and vehicle bracket being connected by at least two connecting sections, a first connecting section of the connecting sections located at the first side of the steering column and a second connecting section of the connecting sections located at the second side of the steering column, and a housing bracket supported by the housing and configured to secure the housing to the vehicle body, the housing bracket comprising a pair of oppositely-disposed front side installation plate sections that protrude toward the first and second sides of the steering column, and that are connected to and supported by the vehicle bracket, the housing bracket and vehicle bracket being connected by at least two front side connecting sections, a first front side connecting section of the front side connecting sections located at the first side of the steering column and a second front side connecting section of the front side connecting sections located at the second side of the steering column, wherein the installation plate sections are configured to displace with the steering column in the forward direction of the vehicle body in the event of an impact load that is applied in the forward direction, wherein the front side installation plate sections are configured to displace with the steering column in the forward direction of the vehicle body in the event of an impact load that is applied in the forward direction, wherein the first connecting section is closer to a center axis of the steering column than the second connecting section.

2. The impact absorbing steering apparatus according to claim 1, further comprising members provided in the connecting sections between the installation plate sections and the vehicle bracket, the members connected and fastened to both the installation plate sections and the vehicle bracket.

3. The impact absorbing steering apparatus according to claim 1, further comprising a pair of energy absorbing members provided between the pair of installation plate sections and the vehicle bracket, each of the pair of energy absorbing members being formed by bending a plastically deformable metal plate and having a plastically deforming section that plastically deforms as the pair of installation plate sections displace in the forward direction, allowing the pair of installation plate sections to displace in the forward direction.

4. The impact absorbing steering apparatus according to claim 1, wherein the pair of installation plate sections comprise cut out sections that open at rearward edges of the installation plate sections disposed in the rearward direction of the vehicle body;

the impact absorbing steering apparatus further comprising capsules supported by the vehicle bracket such that displacement of the capsules in the forward direction is prevented even when an impact load is applied in the forward direction, and that are engaged with the pair of installation plate sections and arranged inside the cut out sections such that the installation plate sections are displaced from the capsules in the forward direction of the vehicle body by the cut out sections separating from the capsules when an impact load is applied to the pair of installation plate sections; and the impact absorbing steering apparatus further comprising a pair of energy absorbing members provided between the capsules and the pair of installation plate sections, each of the pair of energy absorbing members being formed by bending a plastically deformable wire such that the wire elongates when an impact load is applied to the pair of installation plate sections, allowing the pair of installation plate sections to displace in the forward direction.

5. The impact absorbing steering apparatus according to claim 1, further comprising members located between the pair of front side installation plate sections and the vehicle bracket that are connected and fastened to both the front side installation plate sections and the vehicle bracket.

* * * * *